Aug. 14, 1923.

S. FEINBERG 1,465,213

AUTOMOBILE MIRROR BRACKET AND JOINT

Filed Oct. 15, 1921

WITNESSES
E. A. Wilson
Robert J. Hulsizer

INVENTOR
SIDNEY FEINBERG
BY
ATTORNEYS

Patented Aug. 14, 1923.

1,465,213

UNITED STATES PATENT OFFICE.

SIDNEY FEINBERG, OF NEW YORK, N. Y.

AUTOMOBILE MIRROR BRACKET AND JOINT.

Application filed October 15, 1921. Serial No. 507,997.

*To all whom it may concern:*

Be it known that I, SIDNEY FEINBERG, a citizen of the United States, and a resident of the city of New York, borough of Bronx, in the county of Bronx and State of New York, have invented a new and Improved Automobile Mirror Bracket and Joint, of which the following is a full, clear, and exact description.

This invention relates to a bracket and universal joint for automobile mirrors, and has for an object the provision of means whereby the mirror in its various adjustable positions is more advantageously disposed at all times with respect to the bracket whereby the mirror can be more easily manipulated.

Another object resides in the provision of a construction whereby the bracket and the mirror have a much more finished and neat appearance, due to the particular mechanical relation existing between the parts.

A further object resides in the provision of means whereby the number of parts involved is smaller than hitherto and in which the expense of manufacturing the device is considerably reduced by reason of the simplicity of the parts.

A still further object resides in the particular construction and arrangement of parts which are hereinafter described and claimed and shown in the accompanying drawings.

The invention is illustrated in the drawings, of which—

Figure 1:
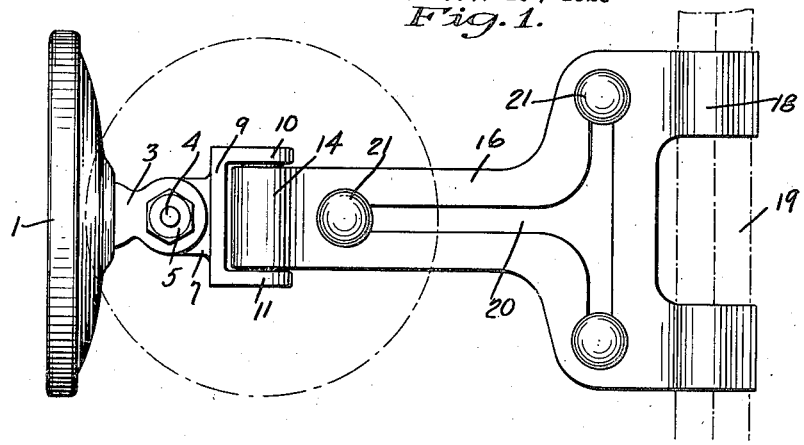
Figure 1 is a side view of the bracket and mirror attached to a part of an automobile.
Figure 2:
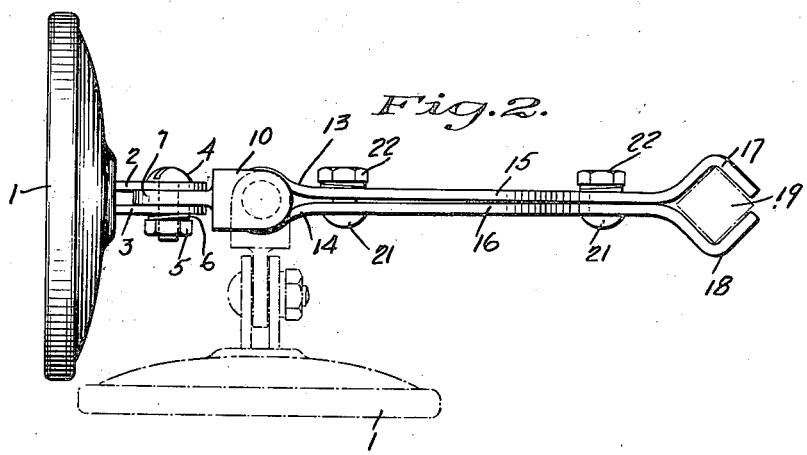
Figure 2 is a plan view of the device as shown in Figure 1.

The invention as illustrated in the drawings represents a preferred form of my invention, although it should be understood that certain changes in the arrangement and construction of the parts and in the character of materials used may be made without departing from the spirit of the invention as set forth and claimed.

The invention comprises a mirror 1, central from the rear face of which a pair of spaced plates 2 and 3 extend. These plates are provided with suitable apertures through which a screw-headed bolt 4 extends. This bolt is provided on its other end with a nut 5 and a washer 6 of any suitable form.

Between the plates 2 and 3 there is adapted to be disposed a projecting plate 7 having an aperture 8 through which the bolt 4 extends. This plate 7 projects centrally from the front face of the base portion 9 of a U-shaped casting the plates or legs 10 and 11 of which are bent at right angles to the portion 9 and extend rearwardly to form the U. The leg portions 10 and 11 extend in one direction from the base member 9, whereas the plate 7 extends in the opposite direction, and these plates or legs 10 and 11 are also disposed in planes at right angles to the plane in which plate 7 is included. A pintle bar or shaft 12 extends from the inner face of plate or leg 10 to the inner face of plate or leg 11. The axis of the bar 12, it will be seen therefore, is in the same plane as the plate 7 but extends in a direction at right angles to the direction in which the plate 7 extends.

This pintle bar 12 is adapted to be embraced by the curved ends 13 and 14 of a pair of arms 15 and 16, the other ends 17 and 18 of which are bent to engage any portion of an automobile, preferably the side 19 of a windshield frame. The arms 15 and 16 are provided with suitable apertures or openings 20 of irregular shape in which adjusting bolts 21 provided with nuts 22 can be disposed to clamp the two arms together.

Figure 3:
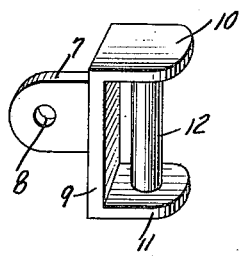
Figure 3 is a perspective view of a casting forming one of the members of the universal joint by reason of which the mirror can be manipulated.

It will be observed that the disposition of the bar 12 and the plate 7 on the casting shown in Fig. 3, forming a member of the universal joint upon which the mirror 1 operates, provides means whereby the joint is at all times centrally and symmetrically disposed with respect to the mirror. This particular arrangement and construction forms a much neater and more compact appearing bracket and joint and also a device in which the movements of the mirror are simpler and more regular.

What I claim is:

An automobile mirror bracket and universal joint connection, consisting of a mirror, a pair of spaced apart plates extending rearwardly and centrally from the mirror, a U-shaped joint casting comprising a base or body portion, rearwardly extending legs at the upper and lower ends of the body portion, a pintle bar extending between said legs and rigidly connecting the same, a plate extending forwardly from said body portion in a plane coinciding with the plane of the axis of the pintle bar, said plate having a transverse opening therethrough and adapted to be pivotally mounted between said spaced apart plates, a bracket arm comprising twin plates having curved ends at one extremity adapted to embrace said pintle bar, and angular bands at the other extremity adapted to be rigidly clamped to a windshield, the bracket arm plates having alined horizontal slots and connecting branch vertical slots therethrough, and clamping bolts disposed in the said slots whereby to clamp said bracket arm to the pintle bar and windshield respectively.

SIDNEY FEINBERG.